United States Patent
Long

(10) Patent No.: US 8,904,597 B2
(45) Date of Patent: Dec. 9, 2014

(54) CASTER WHEEL BUMPER

(71) Applicant: Pipp Mobile Storage Systems, Inc., Walker, MI (US)

(72) Inventor: Matthew Michael Long, Chicago, IL (US)

(73) Assignee: Pipp Mobile Storage Systems, Inc., Walker, MI (US)

( * ) Notice: Subject to any disclaimer, the term of this patent is extended or adjusted under 35 U.S.C. 154(b) by 0 days.

(21) Appl. No.: 13/658,159

(22) Filed: Oct. 23, 2012

(65) Prior Publication Data

US 2013/0097808 A1 Apr. 25, 2013

Related U.S. Application Data

(60) Provisional application No. 61/550,663, filed on Oct. 24, 2011.

(51) Int. Cl.
*B60B 33/00* (2006.01)

(52) U.S. Cl.
CPC ....... *B60B 33/0015* (2013.01); *B60B 2900/212* (2013.01); *B60B 33/0073* (2013.01); *B60B 33/0049* (2013.01); *B60B 33/0023* (2013.01); *B60B 33/0057* (2013.01); *B60B 33/0081* (2013.01); *B60B 33/0047* (2013.01); *B60B 33/0068* (2013.01)
USPC ..................................................... 16/18 CG

(58) Field of Classification Search
CPC .. B60B 33/00; B60B 33/0015; B60B 33/0026
USPC ...................................... 16/18, 18 R, 18 CG
See application file for complete search history.

(56) References Cited

U.S. PATENT DOCUMENTS

| | | | | |
|---|---|---|---|---|
| 316,382 | A * | 4/1885 | Michelson | 16/18 R |
| 1,906,590 | A * | 5/1933 | Hewson | 248/345.1 |
| 2,426,664 | A * | 9/1947 | Blazey | 16/31 R |
| 2,447,582 | A * | 8/1948 | Klumb | 16/44 |
| 3,042,461 | A * | 7/1962 | Smith | 384/440 |
| 3,246,908 | A * | 4/1966 | Marvin | 280/29 |
| 3,345,675 | A * | 10/1967 | Haydock | 16/45 |
| 5,371,920 | A * | 12/1994 | Rainville | 16/18 CG |
| 5,615,450 | A * | 4/1997 | Butler | 16/18 CG |
| 5,720,079 | A * | 2/1998 | Yang | 16/35 R |
| 5,873,144 | A * | 2/1999 | Tupper et al. | 16/18 CG |
| 6,244,417 | B1 * | 6/2001 | Timmer et al. | 193/35 MD |
| 2006/0048335 | A1 * | 3/2006 | Michalos | 16/43 |
| 2010/0229340 | A1 * | 9/2010 | Cheng | 16/45 |

FOREIGN PATENT DOCUMENTS

CH              633996   A   *  1/1983   ............... B60B 7/02

* cited by examiner

*Primary Examiner* — Emily Morgan
(74) *Attorney, Agent, or Firm* — Gardner, Linn, Burkhart & Flory, LLP

(57) ABSTRACT

A protective bumper attaches to a caster wheel assembly and substantially surrounds the assembly to act as a point of contact with other objects or articles, in order to limit or prevent damage to struck objects, and/or to the caster wheel assembly, and/or to a movable object or article supported on the caster wheel assembly. The protective bumper includes an outer bumper portion and an inner frame portion that attaches to a frame of the caster wheel assembly. The bumper may be attached to the caster wheel assembly via an axle that rotatably couples a wheel to the frame of the wheel assembly. Optionally, the outer bumper portion may be fitted with a relatively soft annular outer member or surface.

16 Claims, 16 Drawing Sheets

CASTER WHEEL BUMPER

CROSS REFERENCE TO RELATED APPLICATION

The present application claims the benefit of U.S. provisional application Ser. No. 61/550,663, filed Oct. 24, 2011, which is hereby incorporated herein by reference in its entirety.

FIELD OF THE INVENTION

The present invention relates generally to caster wheels and, more particularly, to protective devices that limit or prevent damage caused by (or caused to) caster wheels and other objects.

BACKGROUND OF THE INVENTION

Many different types of carts, furniture, storage racks, and the like are mounted atop caster wheels, some of which may be capable of swiveling 360 degrees, or through a more limited range. This allows the articles or furniture supported on the caster wheels to be readily moved along a floor or other support surface. However, caster wheels and the articles they support may be prone to damaging other objects or surfaces, or to being damaged themselves, particularly when the caster wheels extend outwardly from the article, or when the article includes hard edges or surfaces that may be prone to damaging other articles or surfaces in the event of accidental impact.

SUMMARY OF THE INVENTION

The present invention provides a protective bumper for attachment to a caster wheel assembly, such as a full-swiveling caster wheel. The bumper limits or prevents the caster wheel and/or an article supported by the wheel from directly contacting another article or surface, such as to prevent damage to the struck article or surface, or to the caster wheel assembly or the article supported by the wheel assembly, for example. The protective bumper extends substantially around the caster wheel assembly to which it is attached, and extends a sufficient distance outwardly from the caster wheel so that the protective bumper will generally be the first point of contact with another object or article or surface in the event of a collision.

According to one form of the present invention, a protective bumper for a caster wheel assembly includes an inner frame portion coupled to an outer bumper portion. The inner frame portion engages a caster wheel for supporting the protective bumper thereat, and the outer bumper portion extends substantially or entirely around a periphery of the caster wheel assembly. Optionally, the outer bumper portion is generally annular in shape, with a longitudinal axis that is aligned substantially vertically when installed at a caster wheel assembly.

In one aspect, the outer bumper portion of the protective bumper includes an inner portion made of relatively hard material, and an outer portion made of relatively soft material. Optionally, the inner portion of the outer bumper portion is unitarily formed with the inner frame portion, such as from the relatively hard material.

In another aspect, the inner frame portion couples to a caster wheel via an axle bolt of the caster wheel.

In yet another aspect, the inner frame portion of the protective bumper includes a pair of cross-members in horizontally spaced arrangement. Both cross-members extend between opposite sides of the outer bumper portion and receive the caster wheel in the space defined between the cross-members.

In still another aspect, at least one of the cross-members includes a first projection that is directed inwardly to engage a frame portion of the caster wheel. The first projection maintains the protective bumper in substantially fixed relation to the caster wheel when the protective bumper is mounted to the caster wheel assembly. Optionally, the cross-member includes a second projection that is spaced from the first projection, and that is directed inwardly to engage another frame portion of the caster wheel. Optionally, each of the projections is an elongate projection, with the first and second elongate projections being non-parallel to one another.

In a further aspect, each of the cross-members includes respective first and second projections that are positioned in a mirror-image arrangement relative to one another.

In a still further aspect, each of the cross-members defines an aperture for receiving a portion of the caster wheel assembly's axle bolt, with the apertures being located between the first and second projections of the cross-members.

In another aspect, the outer bumper portion includes an upper surface that defines at least one recess for permitting access to a portion of the caster wheel assembly to which the protective bumper is attached.

Thus, the present invention provides a protective bumper that can be attached to and disposed around a caster wheel assembly so that any article or object or surface contacted by the wheel assembly (or an object or article supported by the wheel assembly) will be contacted by the protective bumper, thus protecting the articles or objects from damage. The protective bumper will move with a full-swiveling caster wheel assembly so that the protective bumper will swivel with the caster wheel and provide protection on all sides, whereby other objects or articles are protected from damage regardless of the caster wheel assembly's orientation as it approaches another object or article.

These and other objects, advantages, purposes and features of the present invention will become apparent upon review of the following specification in conjunction with the drawings.

DESCRIPTION OF THE PREFERRED EMBODIMENTS

Figure 1:
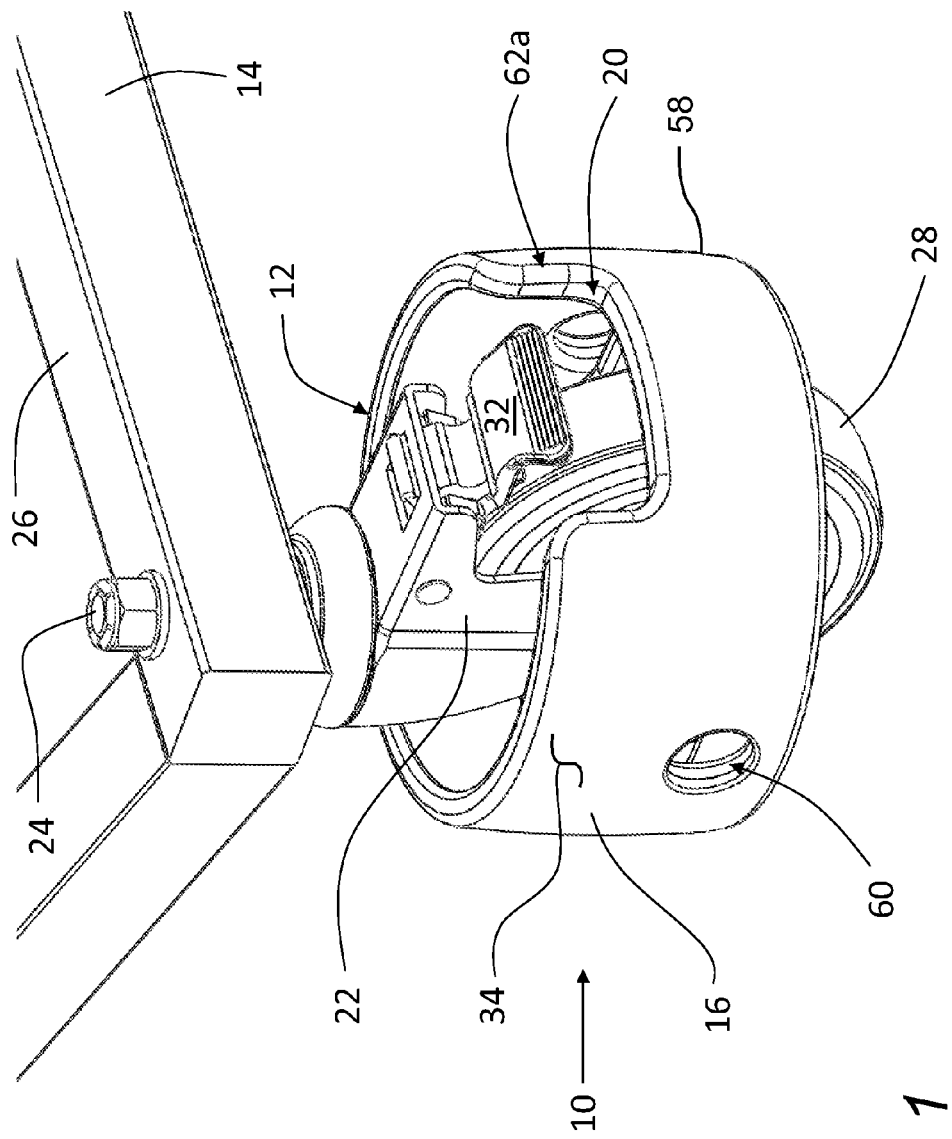
FIG. 1 is a perspective view of a protective bumper in accordance with the present invention, shown mounted to a caster wheel assembly on a movable framework.
Figure 2:
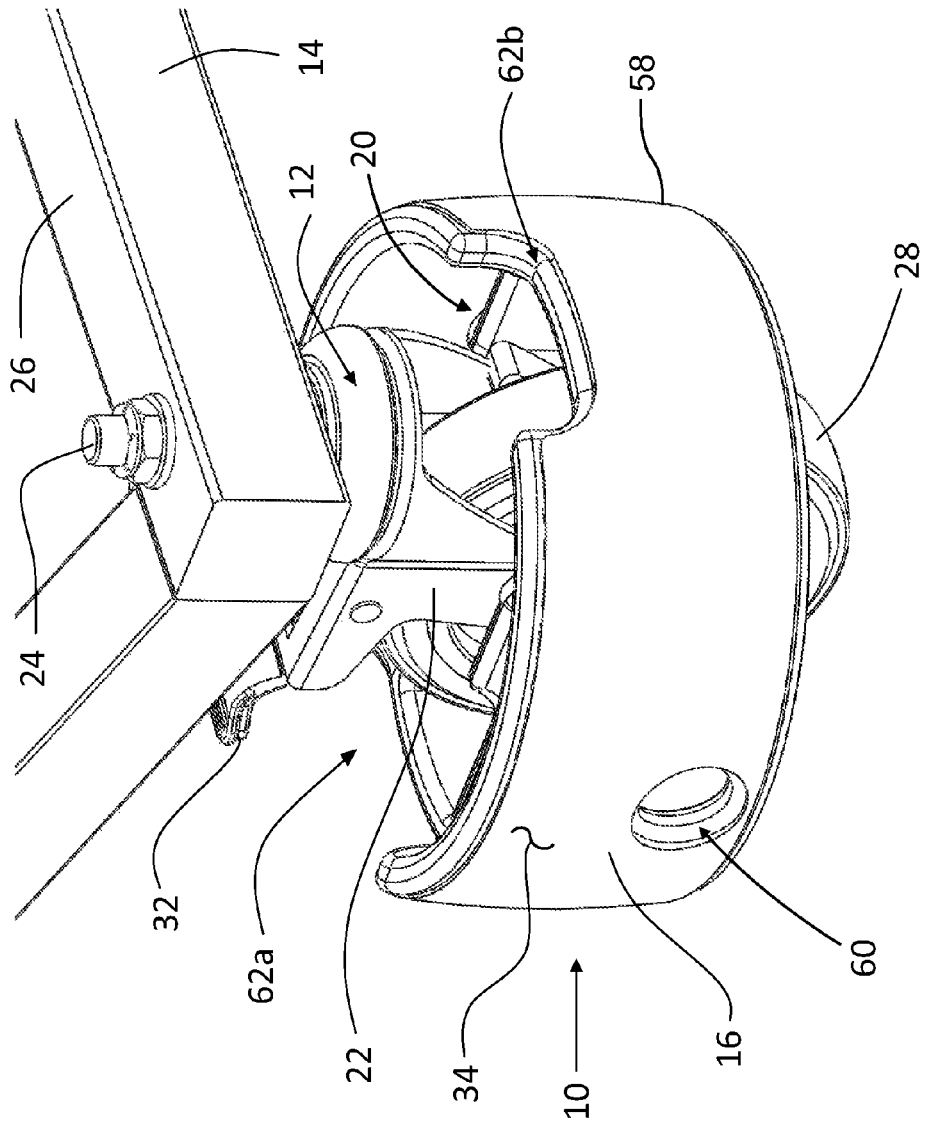
FIG. 2 a perspective view of another protective bumper similar to that of FIG. 1, shown with the caster wheel and bumper in a different orientation.
Figure 3:
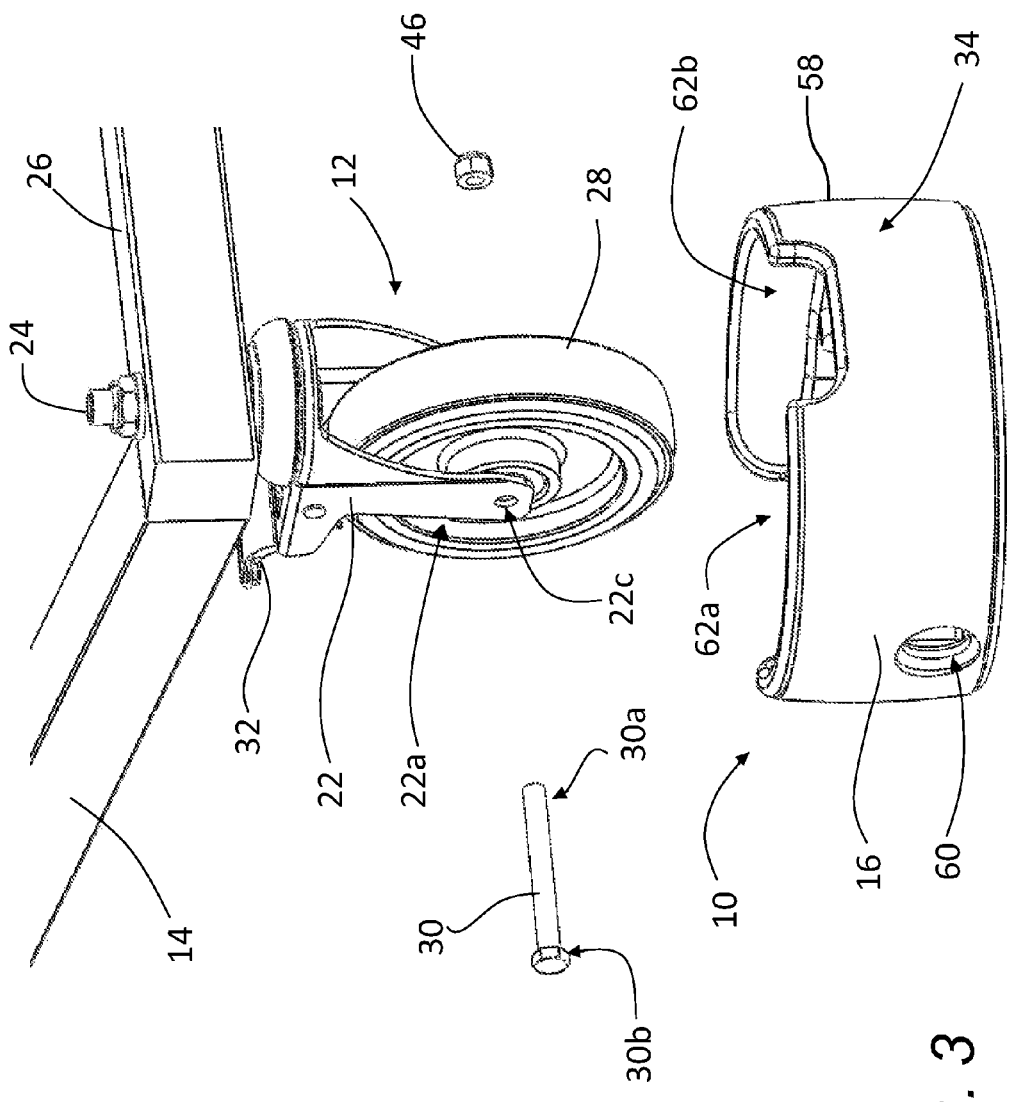
FIG. 3 is a partially exploded view of the bumper, caster wheel assembly, and movable framework of FIG. 2.
Figure 4:
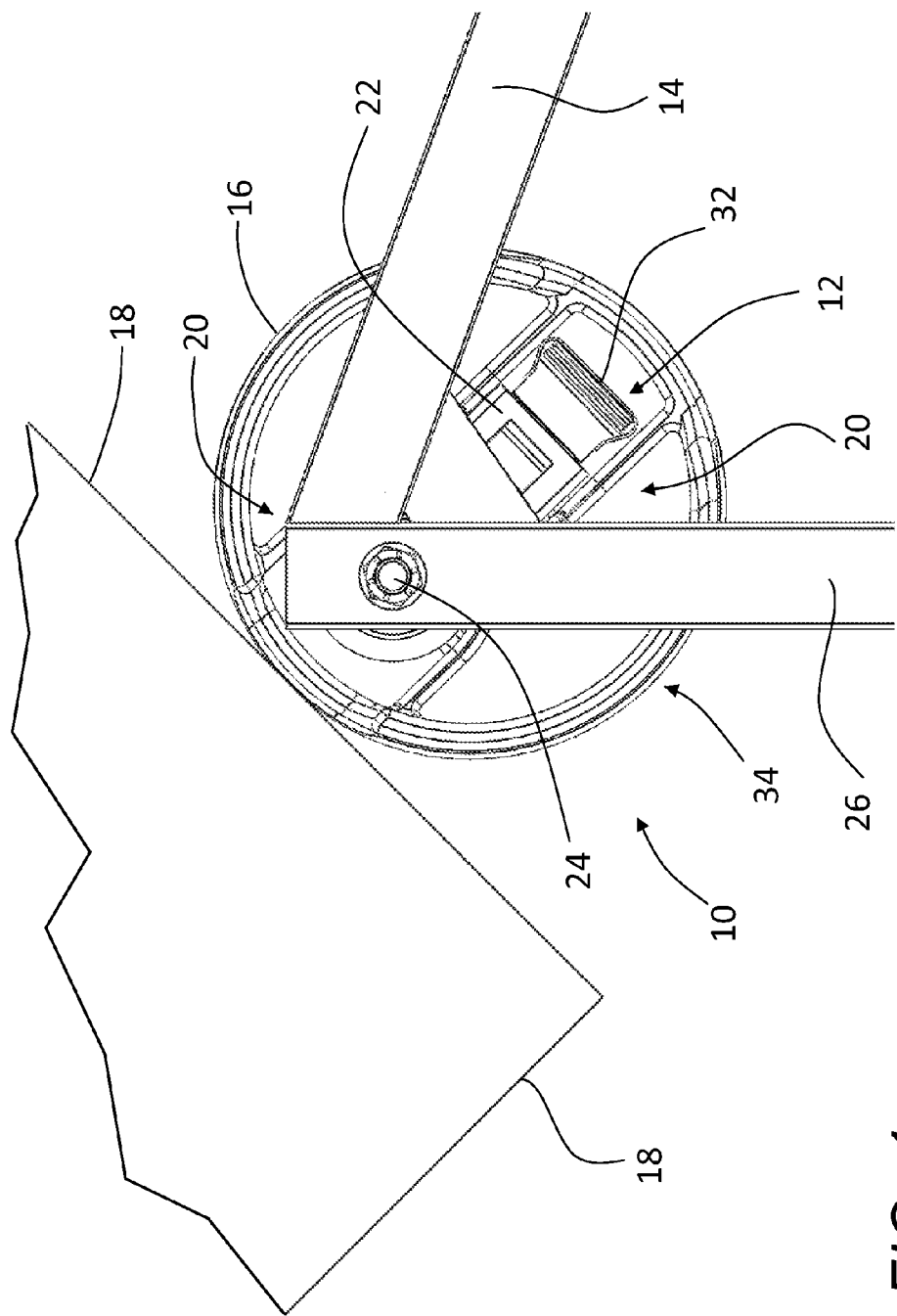
FIG. 4 is a top plan view of the bumper, caster wheel assembly, and framework of FIG. 2, shown with the bumper contacting an object.
Figure 5:
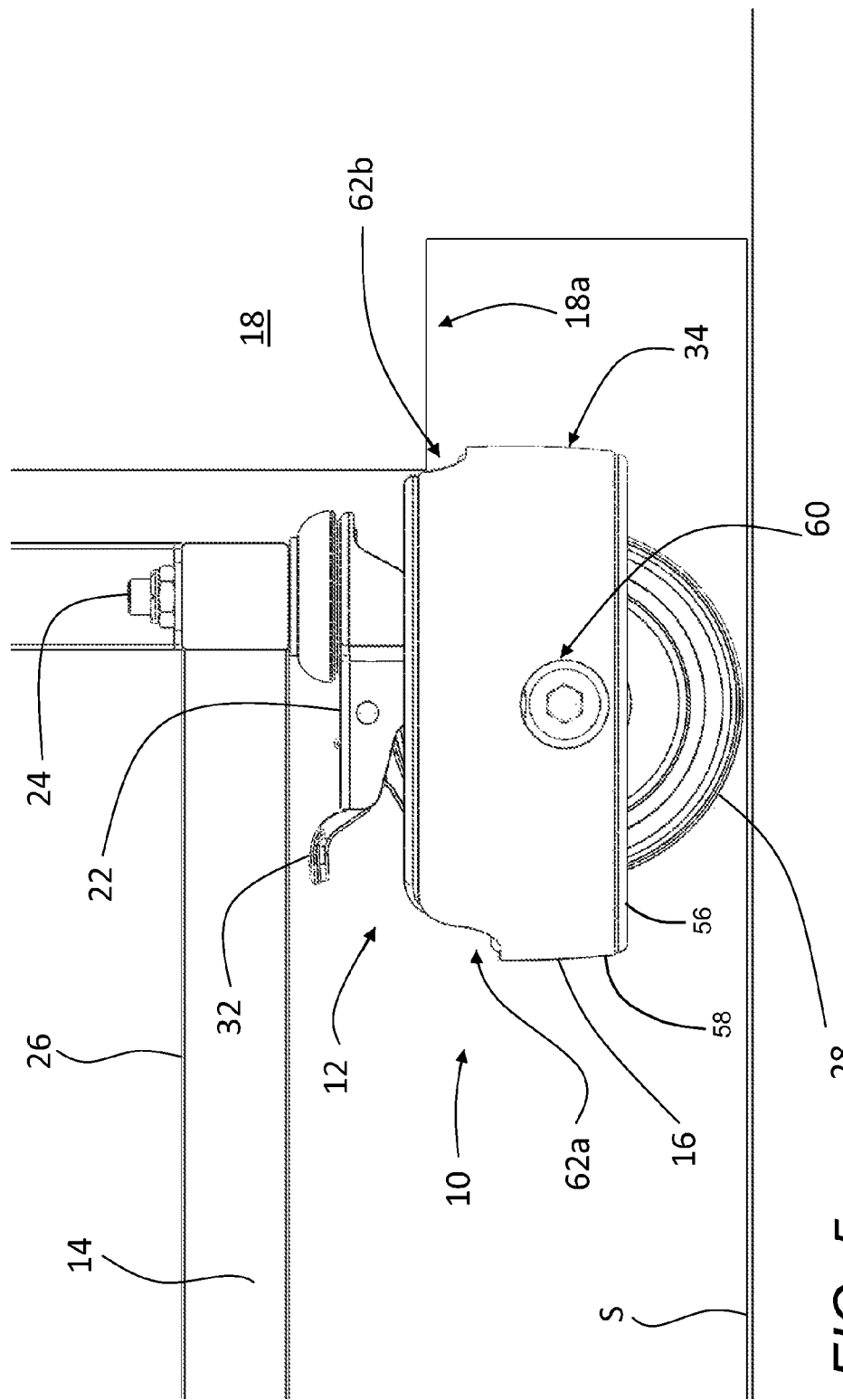
FIG. 5 is a side elevation of the bumper shown contacting the object as in FIG. 4.
Figure 6:
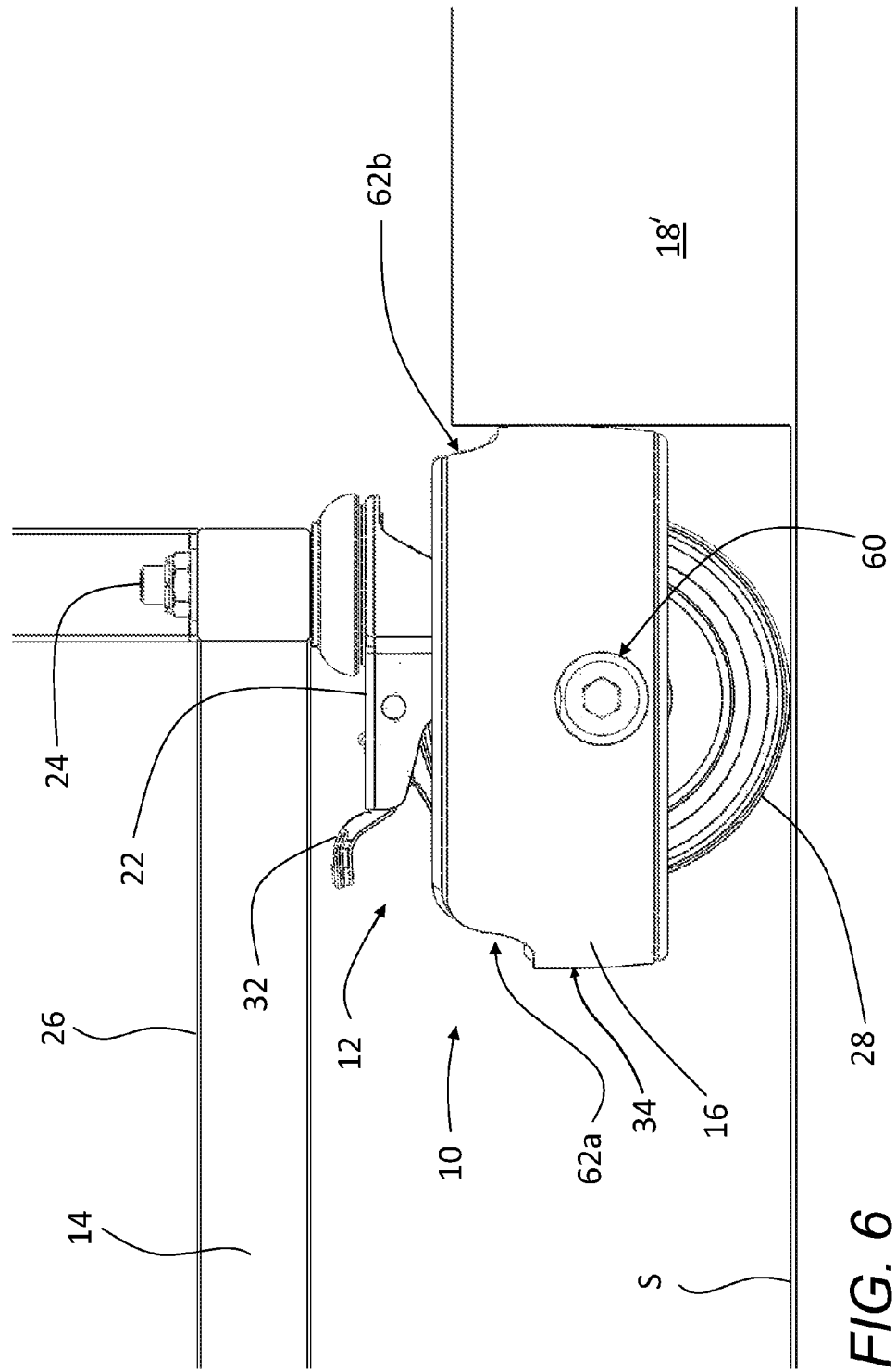
FIG. 6 is another side elevation of the bumper of FIG. 2, shown contacting a different object.
Figure 7:
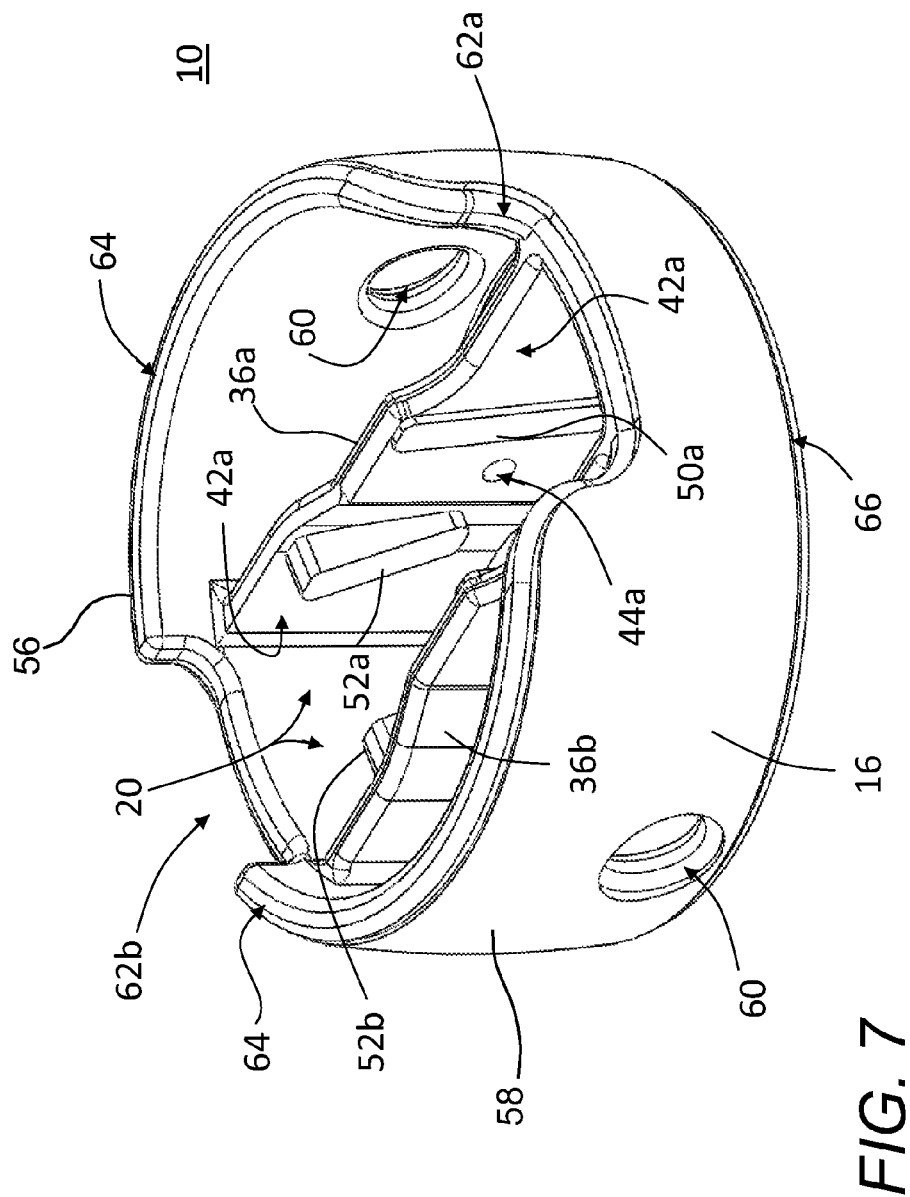
FIG. 7 is a top perspective view of the bumper of FIG. 2, with the caster wheel assembly omitted for clarity.
Figure 8:
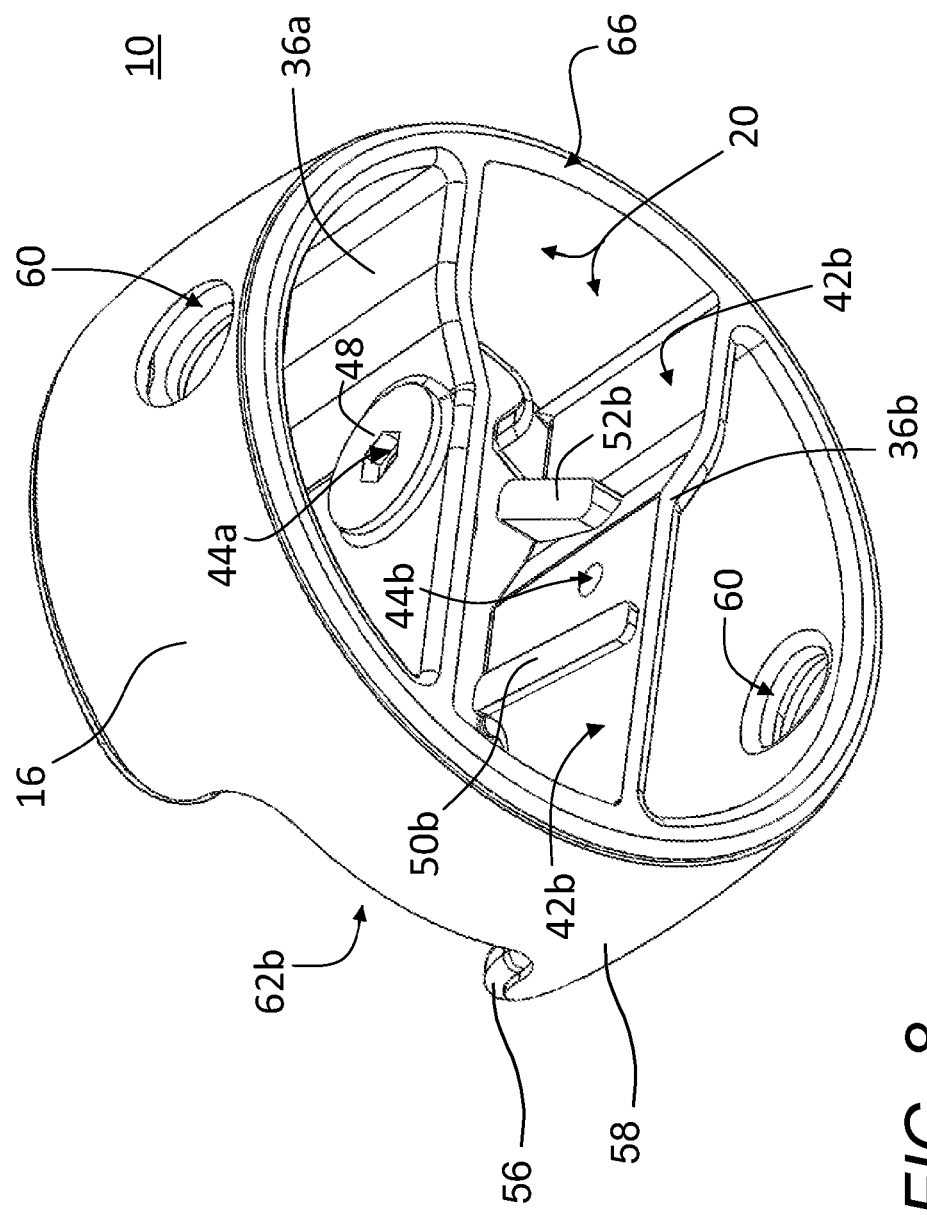
FIG. 8 is a bottom perspective view of the bumper of FIG. 7.
Figure 9:
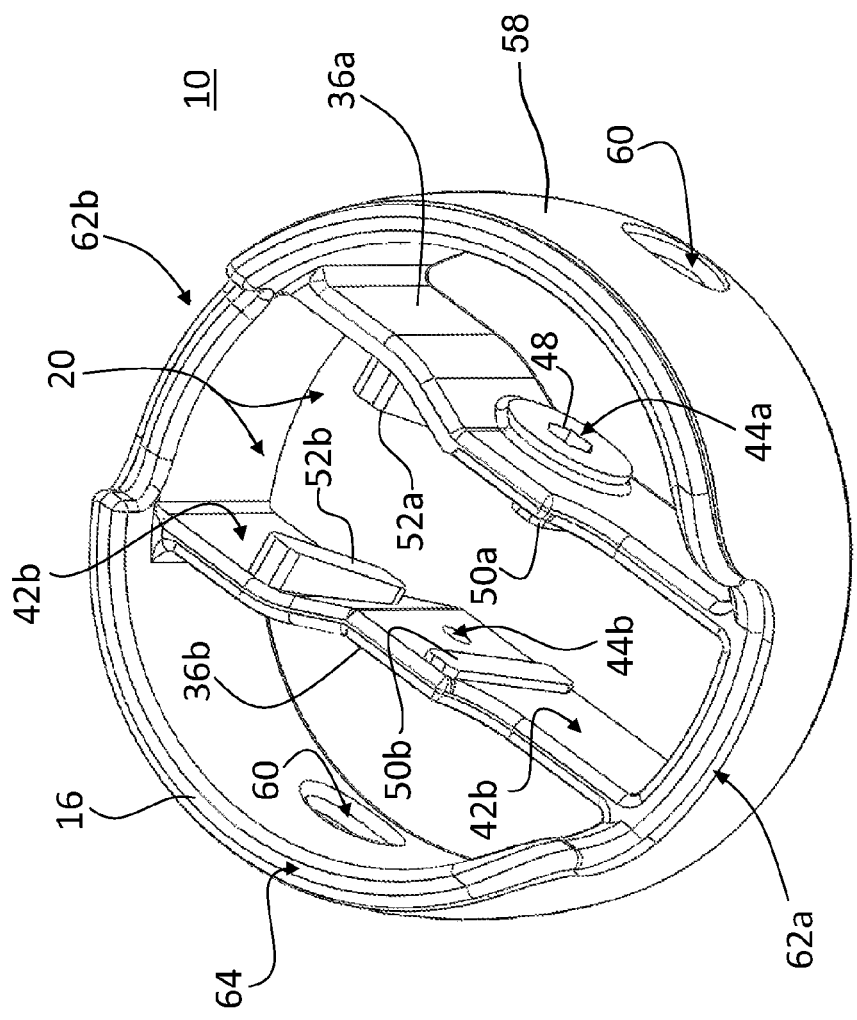
FIG. 9 is another top perspective view of the bumper of FIG. 7.
Figure 10:
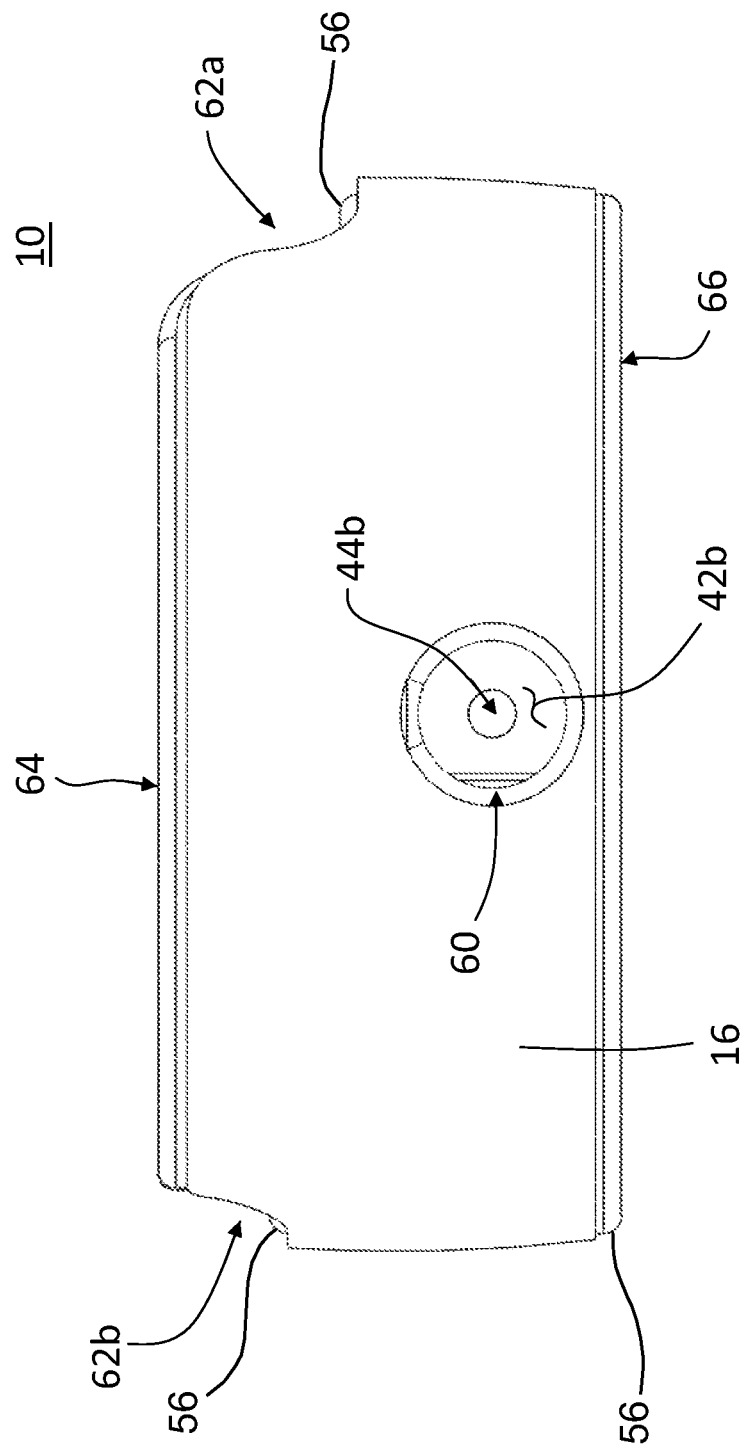
FIG. 10 is a right side elevation of the bumper of FIG. 7.
Figure 11:
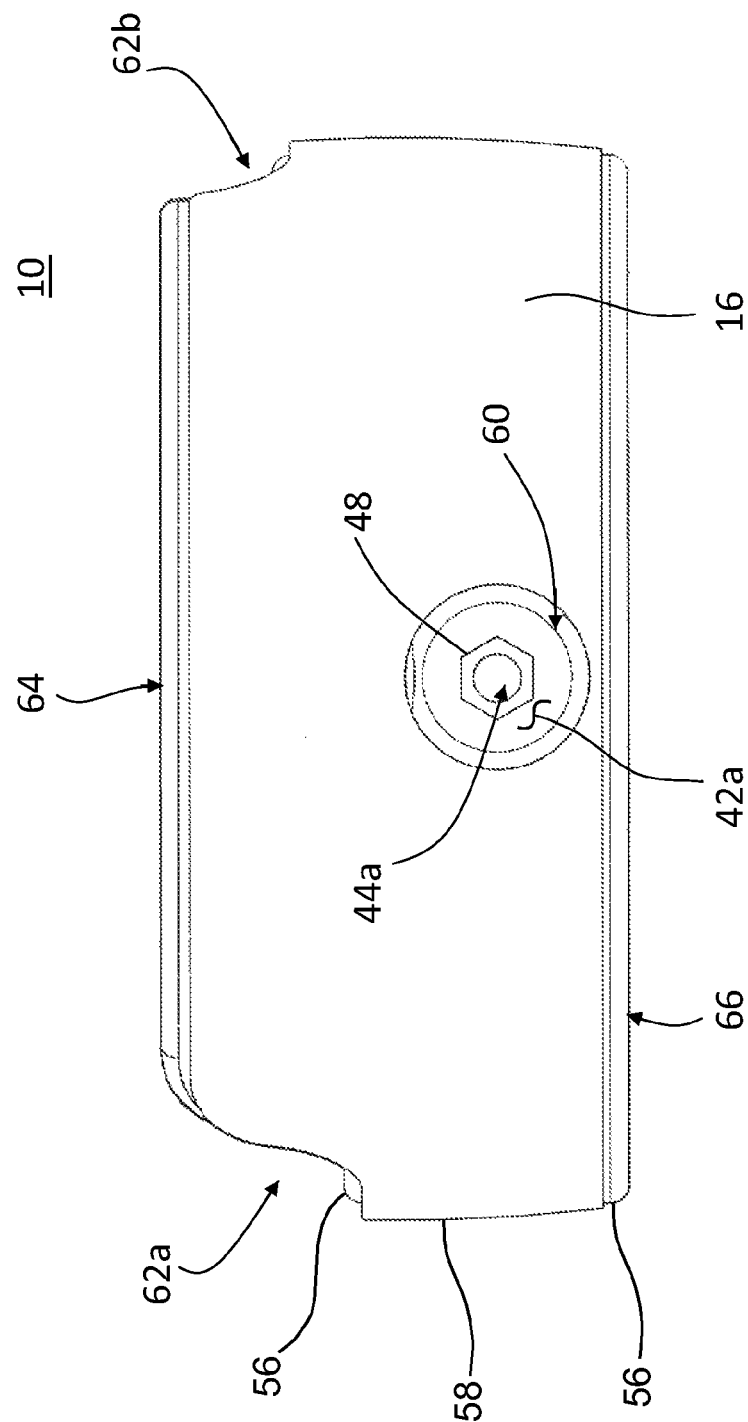
FIG. 11 is a left side elevation of the bumper of FIG. 7.

Referring now to the drawings and the illustrative embodiments depicted therein, a protective bumper 10 is provided for protecting objects or articles from damage due to contact with a caster wheel assembly 12, or due to contact with a movable article or object 14 that is supported on caster wheel assembly 12 (FIGS. 1-3). However, as will be described below, the protective bumper of FIGS. 2 and 3 is slightly different than that of FIG. 1 in that the former has two upper recesses and a soft annular overmold around its perimeter, compared to a single upper recess and larger overmolded portion in the embodiment of FIG. 1. It will be appreciated that movable article 14 represents substantially any object or article that may be mounted on a caster wheel such as, for example, furniture articles, rolling carts and cabinets, work stations, test stands, storage devices, and the like. Protective bumper 10 includes an outer bumper portion 16 that substantially surrounds caster wheel assembly 12, and that is spaced sufficiently outwardly of the surfaces of the caster wheel assembly so that any struck object 18 will be contacted by outer bumper portion 16 rather than by caster wheel assembly 12 or movable object 14 (FIGS. 4-6). Thus, protective bumper 10 will generally protect struck objects 18 from damage caused by caster wheel assembly 12 or the object or article 14 to which the wheel assembly is attached, and will also protect the wheel assembly 12 and supported article 14 from damage caused by the struck object 18, and offers such protection substantially regardless of the orientation of the caster wheel assembly to which the protective bumper is attached.

Protective bumper 10 includes an inner frame portion 20 for attaching protective bumper 10 to a swiveling caster wheel frame 22 of caster wheel assembly 12 (FIGS. 4, 7-9, and 12-14). Swiveling frame 22 is rotatable about a substantially vertical axis defined by a mounting shaft or pin 24 that, in the illustrated embodiment, is received in a frame tube 26 of movable object 14 (FIGS. 1-6). Caster wheel assembly 12 further includes a rotatable wheel 28 that is coupled to swiveling frame 22 via an axle bolt 30, such as shown in FIG. 3. In the illustrated embodiment, caster wheel assembly 12 includes a brake lever 32 (FIGS. 1-6) that is pivotally coupled to an upper portion of swiveling frame 22, and that is operable to selectively impinge on wheel 28 to thereby limit or prevent the wheel from rotating and thus limiting or preventing movable object 14 from being readily moved along a floor or other support surface, as is known in the art.

As best shown in FIGS. 1, 2, 4-6, and 13, outer bumper portion 16 is disposed around the periphery of caster wheel assembly 12 so that outer bumper portion 16 extends outwardly beyond the outer surfaces (primarily the wheel 28) of the caster wheel assembly 12. Preferably, and as shown in FIG. 4, outer bumper portion 16 also extends outwardly beyond the outer edges or surfaces of movable object 14. In this way, outer bumper portion 16 will contact substantially any struck object 18 (instead of the struck object being contacted by any part of caster wheel assembly 12 or movable object 14), regardless of the orientation of swiveling frame 22 and rotatable wheel 28 relative to movable object 14 and struck object 18. This helps limit or prevent damage to both struck object 18 and movable object 14, as well as to caster wheel assembly 12.

To limit or prevent damage to struck object 18, outer bumper portion 16 has a substantially smooth outer surface, such as may be formed by a relatively soft outer surface or shell, as will be described in more detail below. Outer bumper portion 16 is generally in the shape of a hollow cylinder having a substantially vertical longitudinal axis, and is sufficiently tall (i.e., its length dimension in the direction of its longitudinal axis) that it will typically be the first (and perhaps only) point of contact with struck object 18, even when the struck object includes an overhang region 18a such as may be found on some floor-mounted cabinets or the like, and such as shown in FIG. 5. When another struck object 18' extends fully down to a floor or other support surface S (FIG. 6), outer bumper portion 16 will also typically be the first and only point of contact with the struck object 18'.

It will be appreciated that the overall dimensions of protective bumper 10 may be selected according to the size of caster wheel assembly 12, the location of caster wheel assembly 12 along the corresponding movable object 14, and the dimensions or locations of objects or articles that are prone to being struck by the movable object or article. In addition, it will be appreciated that although outer bumper portion 16 is shown and described primarily as a generally annular or hollow cylindrical body, it is envisioned that the bumper portion could instead be oval or polygonal in shape, and/or could be discontinuous (i.e. with one or more gaps) around its perimeter or periphery, without departing from the spirit and scope of the present invention. For example, it is envisioned that the outer bumper portion could be at least partially made up of a plurality of radial arms or projections that extend outwardly from the inner frame portion of the protective bumper, and include spaced-apart distal end portions to provide a shock-absorbing and/or protective surface for engaging other objects or articles.

Figure 12:
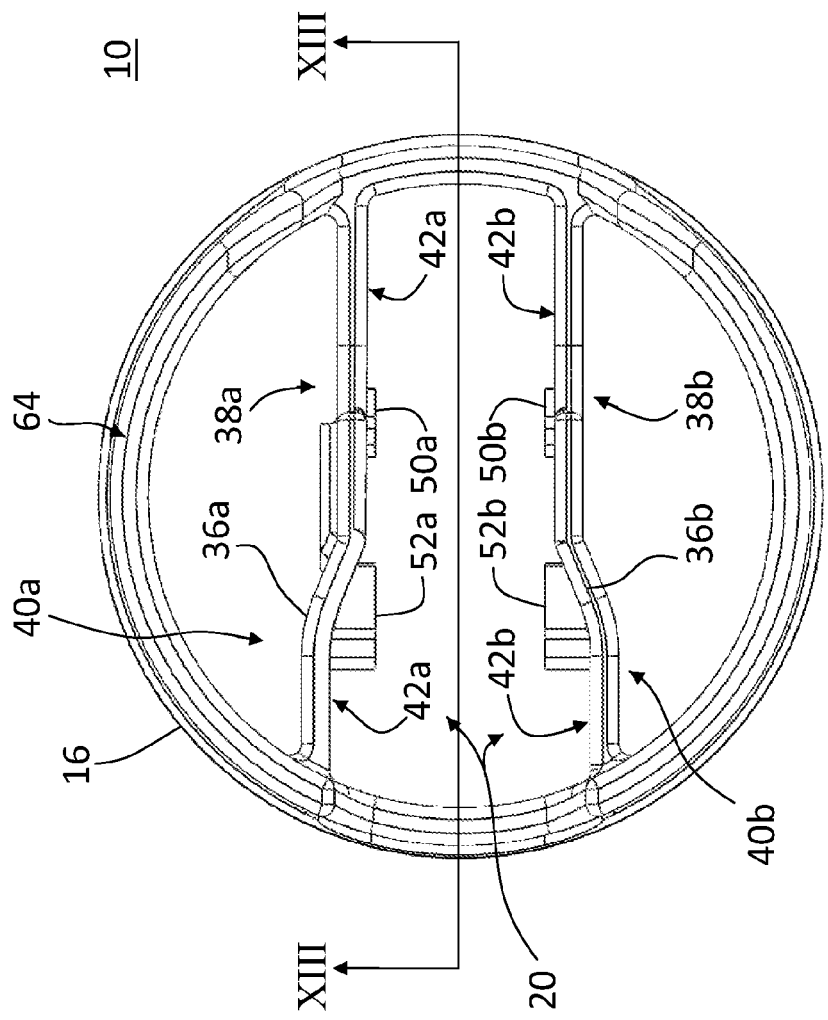
FIG. 12 is a top plan view of the bumper of FIG. 7.
Figure 13:
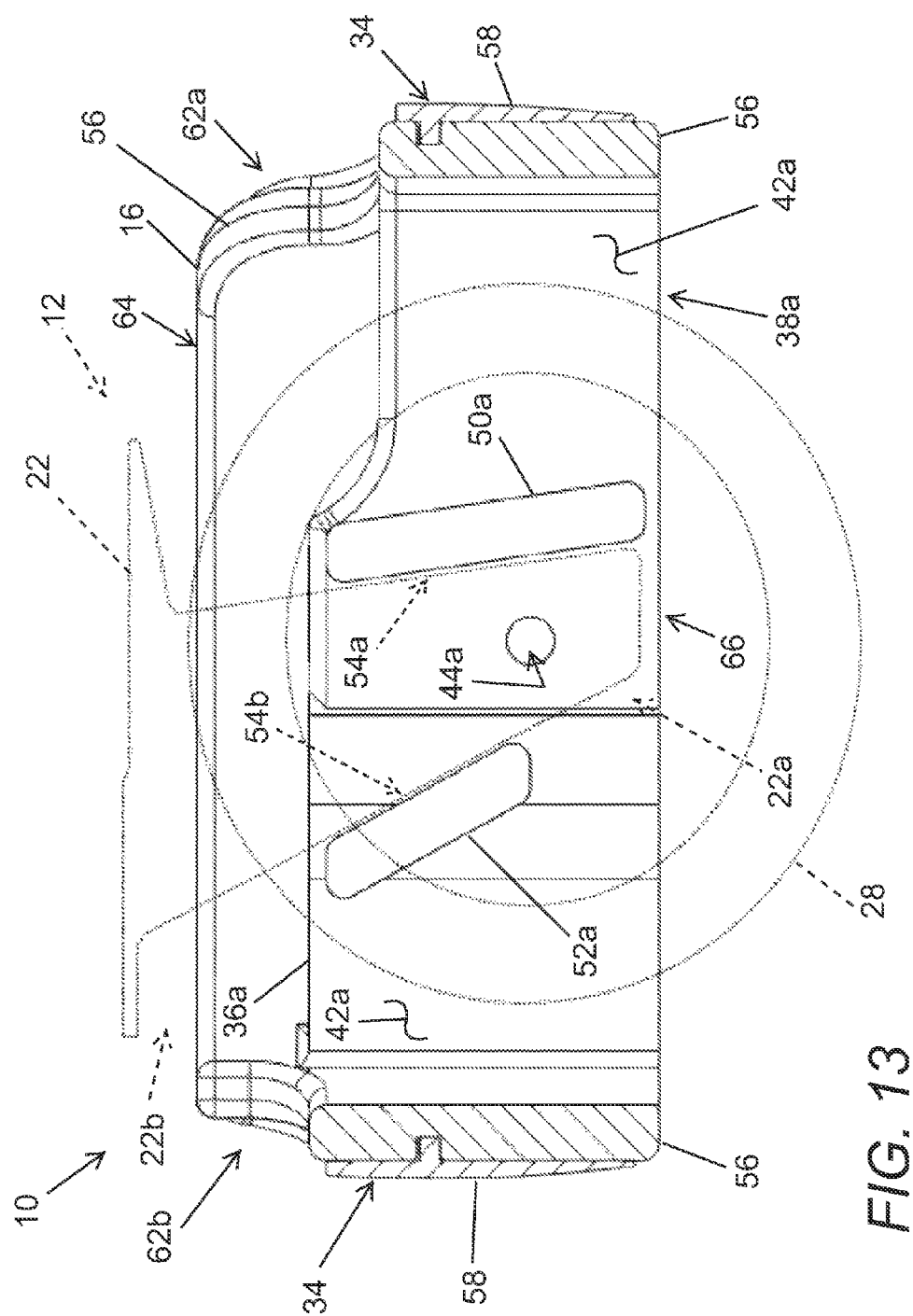
FIG. 13 is a side sectional view of the bumper taken along section line XIII-XIII of FIG. 12, and with a caster wheel assembly shown in phantom lines.
Figure 14:
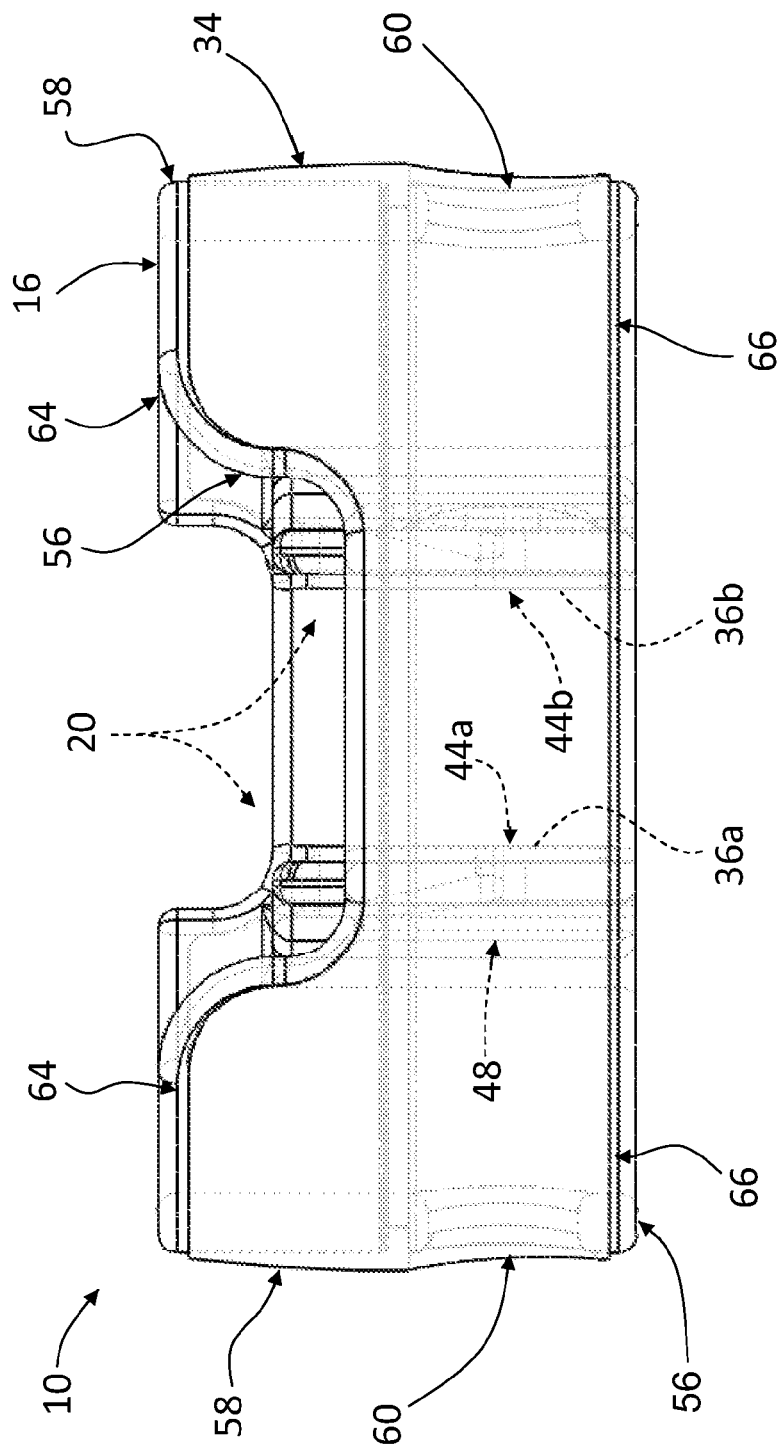
FIG. 14 is a side elevation of the protective bumper of FIG. 7, with interior surfaces shown in phantom.

As noted above, protective bumper 10 attaches to swiveling frame 22 of caster wheel assembly 12 via an inner frame portion 20. As best shown in FIGS. 7-9, 12 and 13, inner frame portion 20 includes first and second cross-members 36a, 36b that are spaced horizontally from one another and span between opposite sides of outer bumper portion 16. Cross-members 36a, 36b include respective generally planar regions 38a, 38b that are spaced relatively closely together for engaging a lower end portion 22a of swiveling frame 22, such as shown in FIGS. 3 and 13. Generally planar regions 38a, 38b span somewhat more than half of the distance between the opposite sides of outer bumper portion 16 before transitioning to respective outwardly-flared regions 40a, 40b that generally follow the contour of a flared upper region 22b of swiveling frame 22. The outwardly-flared regions 40a, 40b terminate at an opposite region of outer bumper portion 16 from where generally planar regions 38a, 38b are attached or terminated, such as best shown in FIG. 12. Thus, generally planar regions 38a, 38b and outwardly-flared regions 40a, 40b of cross-members 36a, 36b cooperate to form inwardly-directed surfaces 42a, 42b that generally follow the outer shape or contour of the respective opposite sides of swiveling frame 22.

Each cross-member 36a, 36b further defines an opening or aperture 44a, 44b for receiving axle bolt 30 on either side of swiveling frame 22, and for simultaneously coupling protective bumper 10 to caster wheel assembly 12 and attaching and rotatably supporting wheel 28 at lower portion 22a of swiveling frame 22. Thus, protective bumper 10 is secured to swiveling frame 22 via axle bolt 30, which passes through opening 44b of cross-member 36b, then passes through an axle opening 22c in lower portion 22a of swiveling frame 22 (FIG. 3), then passes through a central opening (not shown) in rotatable wheel 28, then through another axle opening 22c on the other side of swiveling frame 22, and then through opening 44a in cross-member 36a.

In the illustrated embodiment, axle bolt 30 includes a threaded tip portion 30a that projects outwardly from opening 44a in cross-member 36, and is received by a hexagonal threaded nut 46, which in turn is received in a hexagonal portion 48 of opening 44a. Threaded nut 46 may be pre-installed in hexagonal portion 48 of opening 44a in cross-member 36a, so that protective bumper 10 can be installed at the caster wheel assembly 12 simply by inserting axle bolt 30 as described above with tip portion 30a threadedly engaging nut 46 upon rotation of bolt 30. Nut 46 is prevented from rotating with axle bolt 30 by the correspondingly-shaped hexagonal portion 48 of the opening 44b, while axle bolt 30 is rotated such as with a tool or driver attached to a head portion 30b of the bolt. However, it will be appreciated that other attachment devices or fasteners or methods may be used for permanently or removably attaching the protective bumper to the caster wheel assembly, without departing from the spirit and scope of the present invention.

To limit or prevent protective bumper 10 from rotating or pivoting about a horizontal axis defined by axle bolt 30, each cross-member 36a, 36b includes respective pairs of elongate projections 50a, 50b, and 52a, 52b. In the illustrated embodiment, cross-members 36a, 36b have respective first projections 50a, 50b and respective second projections 52a, 52b. These projections extend inwardly from the respectively inwardly-directed surfaces 42a, 42b to engage opposite edge portions 54a, 54b of the lower portion 22a of swiveling frame 22, such as shown in FIG. 13. In the illustrated embodiment, the swiveling frame's edge portions include a nearly-vertical edge portion 54a and a more angled or diagonal edge portion 54b. Elongate projections 50a, 50b are angled to match the slope of near-vertical edge portion 54a of frame 22. Likewise, elongate projections 52a, 52b are more diagonal and substantially correspond to the slope of diagonal edge portion 54b.

Thus, when protective bumper 10 is installed at caster wheel assembly 12, near-vertical elongate projections 50a, 50b contact (or are in close proximity to) the corresponding near-vertical edge portions 54a on either side of swiveling frame 22, and diagonal elongate projections 52a, 52b engage (or are in close proximity to) the corresponding diagonal edge portions 54b on either side of swiveling frame 22. Contact between the elongate projections of the cross-members 36a, 36b and the edge portions 54a, 54b of the swiveling frame 22 substantially limits or prevents protective bumper 10 from pivoting or rotating relative to caster wheel assembly 12. However, it will be appreciated that even a single elongate projection, such as one similar to any of the projections 50a, 50b and 52a, 52b of the illustrated embodiment, would provide an anti-pivoting function, without need for all four elongate projections of the illustrated embodiment.

In addition, because near-vertical projections 50a, 50b are non-parallel to diagonal projections 52a, 52b, and because the edge portions 54a, 54b of swiveling frame 22 are correspondingly angled and non-parallel to one another, the projections 50a, 50b and 52a, 52b align protective bumper 10 with caster wheel assembly 12 during assembly. This also causes the openings 44a, 44b of cross-members 36a, 36b to align with the corresponding axle openings 22c in swiveling frame 22, to facilitate installation of axle bolt 30. It is further envisioned that projections having other shapes could be used in place of the elongate projections of the illustrated embodiment. For example, one or more pins or pin-like projections could extend inwardly from the surfaces 42a, 42b of either or both cross-members 36a, 36b to limit or prevent protective bumper 10 from pivoting about axle bolt 30, without departing from the spirit and scope of the present invention.

Outer bumper portion 16 is primarily made up of a strong and resilient annular inner portion 56 that is partially encased or surrounded by a relatively soft annular outer portion 58, which forms outer surface 34 of the outer bumper portion 16 (FIG. 13). Annular inner portion 56 may be unitarily formed, including both of the cross-members 36a, 36b, to simplify the manufacturing process and lend strength to protective bumper 10. For example, annular inner portion 56 and cross-members 36a, 36b may be unitarily formed of a strong polymeric or resinous plastic material, such as one having a Shore durometer hardness of about 95 A, while annular outer portion 58 may be molded along an outer surface of annular inner portion 56 and be made of a relatively softer material, such as one having a Shore durometer hardness of approximately 65 A or less. This allows the annular inner portion 56 of bumper portion 16, as well as cross-members 36a, 36b, to resist breakage or damage during inadvertent or accidental contact with struck objects, while the relatively soft material of annular outer portion 58 also reduces the likelihood that a struck object will be damaged by protective bumper 10. Annular outer portion 58 also generally distributes impact loads more evenly across the outer surface of annular inner portion 56 of bumper portion 16, and may reduce the maximum impact loads experienced by annular inner portion 56 and cross-members 36a, 36b by absorbing the impact over the distance by which annular outer portion 58 is compressed during the impact event.

In the illustrated embodiment, annular inner portion 56 and annular outer portion 58 cooperate to define a pair of opposite openings 60 in outer bumper portion 16 to facilitate the installation of axle bolt 30 and threaded nut 46. For example, one of the openings 60 may permit access to the axle bolt 30 and the other may permit access to the threaded nut 46, such as with socket-type ratchet wrenches. In addition, and with reference to FIGS. 2-14, bumper portion 16 includes a generally annular upper surface 64 that defines a first upper recess 62a for improved access to brake lever 32, and that further defines a second upper recess 62b for improved access to a lower portion of mounting pin 24 or a pin fastener (not shown). First and second upper recesses 62a, 62b thus permit or facilitate substantially normal or unobstructed operation and installation of caster wheel assembly 12 with protective bumper 10 installed. However, as shown in FIG. 1, another protective bumper is disclosed which includes only a first upper recess 62a to facilitate access to brake lever 32. The protective bumper of FIG. 1 also includes a soft outer portion that substantially encases the inner frame portion, similar to the embodiment of FIGS. 15 and 16, described below.

Figure 15:
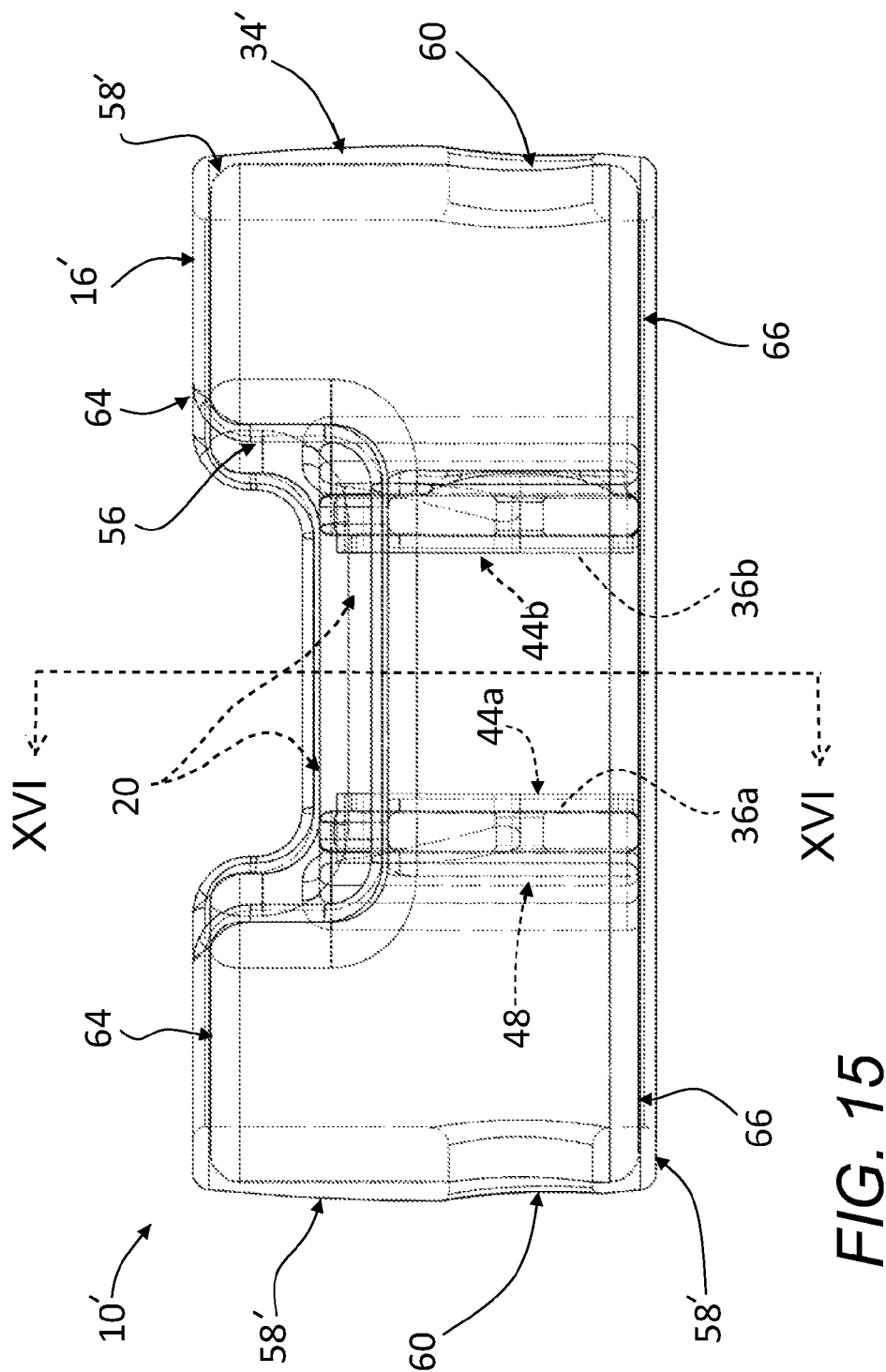
FIG. 15 is a side elevation of another protective bumper shown with an alternative outer cover portion, with interior surfaces shown in phantom.
Figure 16:
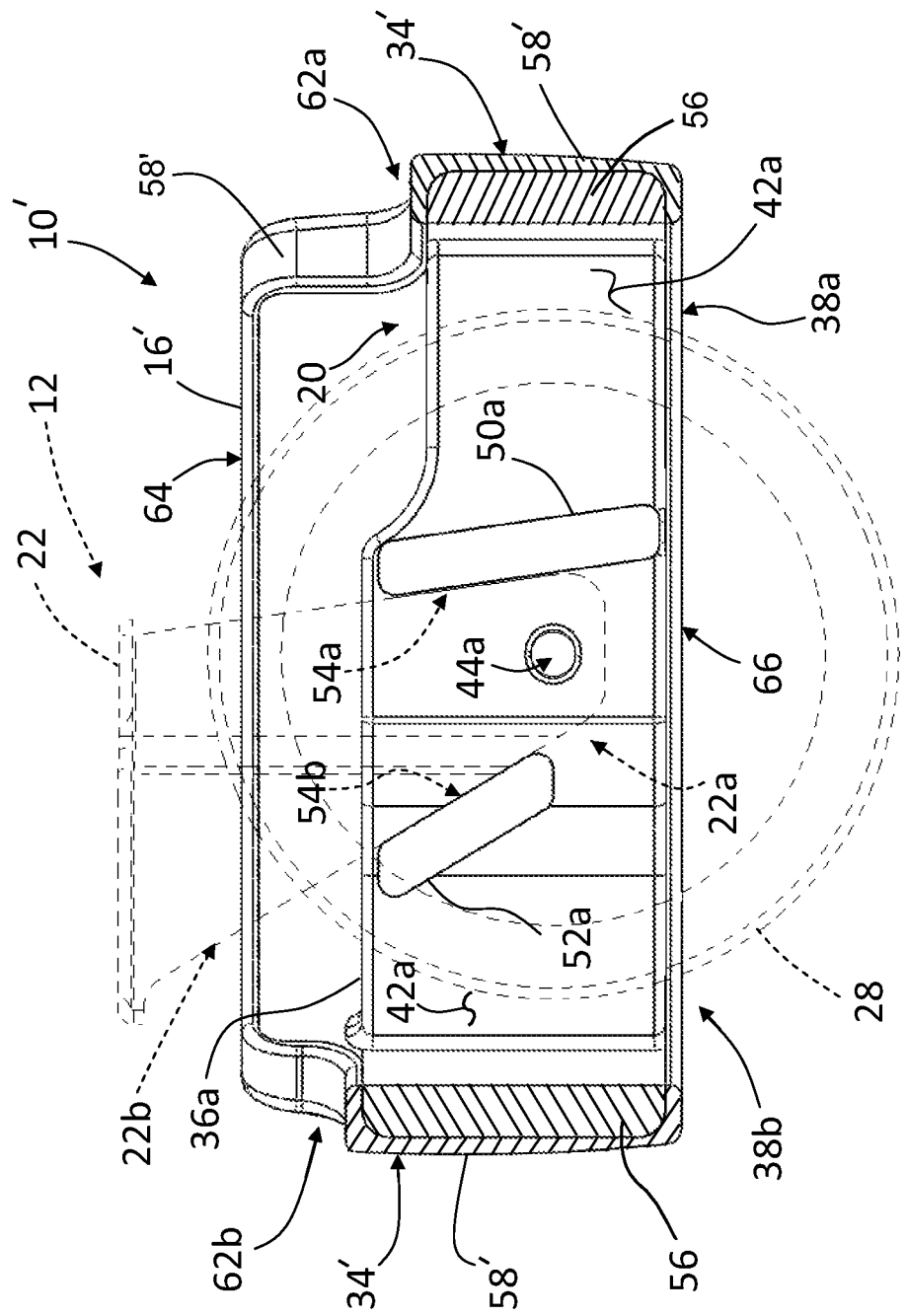
FIG. 16 is a side sectional view of the bumper taken along section line XVI-XVI of FIG. 15, and with a caster wheel assembly shown in phantom lines;.

Optionally, another outer bumper portion 16' includes a relatively soft material forming an annular outer portion 58' that is overmolded or otherwise formed or disposed around a substantial portion of annular inner portion 56 of the outer bumper portion 16', such as shown in FIGS. 15 and 16. In the illustrated embodiment, protective bumper 10' is substantially identical to bumper 10 of FIGS. 2-14, including an identical annular inner portion 56 and inner frame portion 20. However, both the annular upper surface 64 and an annular lower surface 66 of inner portion 56 of outer bumper portion 16' are covered or overmolded by the soft annular outer portion 58'. Thus, annular outer portion 58' forms substantially the entire outer surface 34' of protective bumper 10', extending around substantially the entire outer periphery of outer bumper portion 16' to form the uppermost and lowermost surfaces of the outer bumper portion 16'. This increases the overall height dimension of outer bumper portion 16' (as compared to bumper portion 16) and further reduces and/or distributes impact loads when the protective bumper 10' contacts a struck object.

Thus, the protective bumper is adapted to protect struck objects from damage by a caster wheel assembly and/or to protect a movable article or object to which the caster wheel is attached, and protects a caster wheel assembly itself from damage due to such impacts. The protective bumper swivels with the caster wheel and substantially surrounds the wheel to provide protection for the wheel assembly and any struck objects, regardless of the wheel's orientation. The protective bumper is readily installed at the caster wheel assembly via the wheel assembly's axle bolt, and permits access to the wheel assembly's brake lever and attachment hardware so that the caster wheel assembly remains fully functional with the protective bumper installed.

Changes and modifications in the specifically described embodiments may be carried out without departing from the principles of the present invention, which is intended to be limited only by the scope of the appended claims, as interpreted according to the principles of patent law including the doctrine of equivalents.

The embodiments of the invention in which an exclusive property is claimed are defined as follows:

1. A protective bumper for a caster wheel assembly, said protective bumper comprising:
   an inner frame portion configured for engaging a portion of the caster wheel assembly, said inner frame portion comprising a pair of cross-members in horizontally spaced arrangement, said cross-members each comprising opposite end portions;
   an outer bumper portion coupled to said opposite end portions of said cross-members of said inner frame portion and disposed substantially around said cross-members, and said outer bumper portion configured to be disposed substantially around a periphery of a wheel of the caster wheel assembly;
   wherein said cross-members comprise respective inwardly-directed surfaces configured to engage respective outer surfaces of a frame of the caster wheel assembly, and said cross-members further comprise respective outwardly-directed surfaces that are spaced inwardly from said outer bumper portion; and
   wherein said inwardly-directed surface of at least one of said cross-members comprises a first projection directed inwardly to engage a first portion of the caster wheel frame.

2. The protective bumper of claim 1, wherein said outer bumper portion comprises a generally annular shape having a substantially vertical longitudinal axis.

3. The protective bumper of claim 2, wherein said outer bumper portion comprises an inner portion made of relatively hard material and an outer portion made of relatively soft material that is softer than said relatively hard material of said inner portion.

4. The protective bumper of claim 3, wherein said inner frame portion and said inner portion of said outer bumper portion are unitarily formed.

5. The protective bumper of claim 1, wherein said inner frame portion is configured to couple to a caster wheel frame of the caster wheel assembly via an axle thereof.

6. The protective bumper of claim 5, wherein each of said cross-members comprising a generally planar region terminating at one of said opposite end portions, and an outwardly-flared region terminating at an opposite one of said opposite end portions.

7. The protective bumper of claim 1, wherein said inwardly-directed surface of said at least one of said cross-members comprises a second projection spaced from said first projection and directed inwardly to engage a second portion of the caster wheel frame.

8. The protective bumper of claim 7, wherein each of said first and second projections comprises an elongate projection, and wherein said elongate projections are non-parallel to one another.

9. The protective bumper of claim 8, wherein said inwardly-directed surface of each of said cross-members comprises respective ones of said first and second projections, whereby said first and second projections of a first of said cross-members are arranged as a minor-image with said first and second projections of a second of said cross-members.

10. The protective bumper of claim 9, wherein each of said cross-member defines an aperture configured for receiving a portion of an axle of the caster wheel assembly, said apertures disposed between said first and second projections.

11. The protective bumper of claim 1, wherein said outer bumper portion comprises an upper surface defining at least one recess configured to permit access to a portion of the caster wheel assembly.

12. The protective bumper of claim 1, further in combination with a caster wheel assembly.

13. The protective bumper of claim 12, further in combination with a movable article supported atop three or more of said caster wheel assemblies, each of said caster wheel assemblies supporting a respective one of said protective bumpers.

14. A protective bumper for a caster wheel assembly, said protective bumper comprising:
   an inner frame portion configured for engaging a frame of the caster wheel assembly, said inner frame portion comprising a pair of cross-members in horizontally spaced arrangement, and said cross-members comprising respective opposite end portions;
   an outer bumper portion coupled to said opposite end portions of said cross-members of said inner frame portion and disposed substantially around said cross-members, and said outer bumper portion configured to be disposed substantially around a wheel of the caster wheel assembly, said outer bumper portion including a bumper surface forming a periphery that is configured to be spaced outboard of the wheel of the caster wheel assembly and spaced outboard of said cross-members;
   said cross-members comprising respective inwardly-directed surfaces configured to engage respective outer surfaces of a frame of the caster wheel assembly, each of said inwardly- directed surfaces comprising a first projection configured to engage a first portion of the caster wheel frame, and a second projection configured to engage a second portion of the caster wheel frame;
   wherein each of said cross-members defines an axle aperture configured for receiving an axle of the caster wheel assembly, said axle apertures disposed between said first and second projections; and wherein said outer bumper portion comprises an opening substantially aligned with one of said axle apertures, said opening configured to receive and permit a tool to engage the axle of the caster wheel assembly when said protective bumper is mounted to the caster wheel frame.

15. The protective bumper of claim 14, wherein said first projections and said second projections are elongate in shape, with said first projections in non-parallel alignment with said second projections.

16. The protective bumper of claim 14, wherein said outer bumper portion comprises an upper surface defining a recess configured to permit access to a brake lever at an upper region of the caster wheel assembly when said protective bumper is mounted to the caster wheel assembly.

* * * * *

UNITED STATES PATENT AND TRADEMARK OFFICE
CERTIFICATE OF CORRECTION

PATENT NO. : 8,904,597 B2
APPLICATION NO. : 13/658159
DATED : December 9, 2014
INVENTOR(S) : Long et al.

It is certified that error appears in the above-identified patent and that said Letters Patent is hereby corrected as shown below:

On the title page item [75],
Insert --Max Pau, Sammamish, WA (US)-- after inventor "Matthew Michael Long, Chicago, IL (US)

In the specification

Column 6
Line 20, "95 A" should read --95A--
Lines 23-24, "65 A" should read --65A--

In the claims

Column 8
Line 23, Claim 9, "minor-image" should read --mirror-image--
Line 27, Claim 10, "cross-member" should read --cross-members--

Signed and Sealed this
Thirteenth Day of October, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 8,904,597 B2 | Page 1 of 1 |
| APPLICATION NO. | : 13/658159 | |
| DATED | : December 9, 2014 | |
| INVENTOR(S) | : Long et al. | |

It is certified that error appears in the above-identified patent and that said Letters Patent is hereby corrected as shown below:

On the title page item [12], should read --Long et al.--

On the title page item [75],
Insert --Max Pau, Sammamish, WA (US)-- after inventor "Matthew Michael Long, Chicago, IL (US)

In the specification

Column 6
Line 20, "95 A" should read --95A--
Lines 23-24, "65 A" should read --65A--

In the claims

Column 8
Line 23, Claim 9, "minor-image" should read --mirror-image--
Line 27, Claim 10, "cross-member" should read --cross-members--

This certificate supersedes the Certificate of Correction issued October 13, 2015.

Signed and Sealed this
Seventeenth Day of November, 2015

Michelle K. Lee
*Director of the United States Patent and Trademark Office*